United States Patent [19]
Farrow

[11] 3,806,996
[45] Apr. 30, 1974

[54] ROPE TENSIONING AND SECURING DEVICE

[76] Inventor: Benjamin John Farrow, Cara Wendownee, 4 Coast Road Flats, Qawra, Salina Bay, Malta

[22] Filed: Nov. 24, 1972

[21] Appl. No.: 309,219

[30] Foreign Application Priority Data
Nov. 27, 1971 Great Britain................... 55163/71

[52] U.S. Cl............................. 24/134 R, 114/108
[51] Int. Cl........................... F16g 11/10, B63h 9/04
[58] Field of Search............ 114/90, 101, 108, 218; 24/115 C, 115 E, 115 J, 115 K, 133, 132, 134

[56] References Cited
UNITED STATES PATENTS

| | | | |
|---|---|---|---|
| 99,385 | 2/1870 | Wilbar | 24/134 R |
| 222,328 | 12/1879 | Stoddard | 24/115 C UX |
| 1,252,071 | 1/1918 | Zimmerman | 24/133 |
| 1,592,481 | 7/1926 | Dunne | 24/134 KA |
| 1,660,040 | 2/1928 | Lehtonen | 24/134 KD |
| 1,727,687 | 9/1929 | Agobian | 24/134 P |
| 3,171,277 | 3/1965 | Gloor | 24/134 R X |

Primary Examiner—Donald A. Griffin
Attorney, Agent, or Firm—William Anthony Drucker

[57] ABSTRACT

A device for securing ropes such as sheets and halyards on marine craft comprises a cylindrical boss fixed to a lever which is pivotally attached to a mounting plate. The boss is formed with a groove in its cylindrical surface having a first part annular portion extending around the circumference of the boss at one side and a second helical portion integral with the first portion and leading to a position at the other side of the boss. In use a rope can pass around the boss and lie in said groove, passing first along said first portion and then along said second portion whereafter the rope passes between the boss and that portion of the rope passing along said first portion of the groove.

7 Claims, 4 Drawing Figures

ROPE TENSIONING AND SECURING DEVICE

BACKGROUND TO THE INVENTION

This invention relates to a device for securing and/or tensioning ropes, cables, cord and like filaments and is particularly suitable for securing sheets or halyards on sailing craft.

SUMMARY OF INVENTION

According to the invention I provide a device for securing and/or tensioning ropes comprising a lever adapted at one end for pivotal attachment to a fixed point and a boss attached to said lever at a distance from said one end, said boss being of substantially cylindrical form and formed with a groove in its substantially cylindrical surface having a first part annular portion extending part way around the circumference of the boss at one side thereof and a second portion integral with the first portion being substantially helical and leading to a position at the other side of the boss, whereby in use a rope can pass around the boss and lie in said groove, passing first along said first portion and then along said second portion whereafter the rope passes under that portion of the rope passing along said first portion of the groove. The first part annular portion may be part of a completely annular groove at said one side of the boss.

BRIEF DESCRIPTION OF DRAWINGS

Constructional forms of the invention will now be described with reference to the accompanying drawing in which.

DESCRIPTION OF PREFERRED EMBODIMENT

Figure 1:
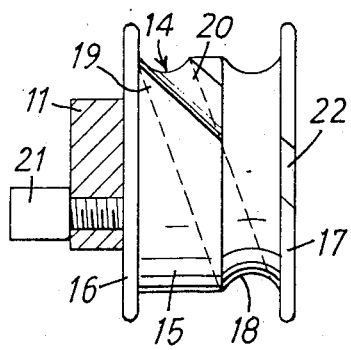
FIG. 1 is an elevation of the boss mounted on the lever, a mounting plate for the lever being omitted.
Figure 2:
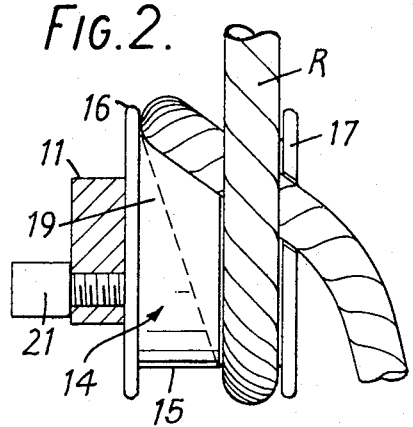
FIG. 2 shows the same elevation of the boss in FIG. 1 but showing a rope to be secured by the device.
Figure 3:
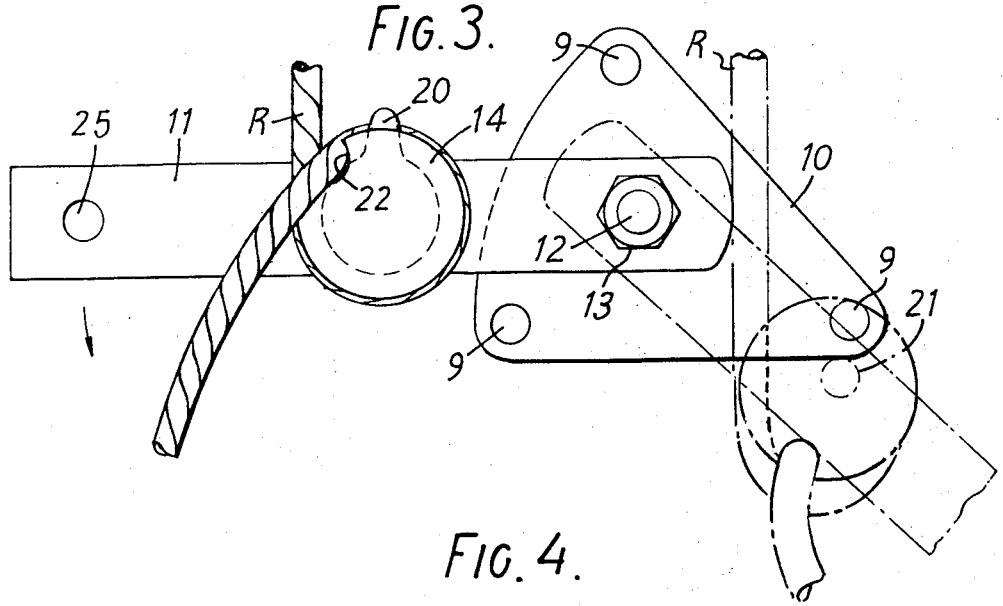
FIG. 3 shows the whole device including a mounting plate, the lever being pivotable from a first position shown in full lines to a second position shown in chain lines where the rope is secured.

The device comprises a base or mounting plate 10 (FIg. 3) by which it is affixed by screw holes 9 where required to be used and a lever 11 pivotally mounted thereon. The base carries a stud 12 on which the lever pivots. The lever has a pivot hole towards one end to fit the stud on the base where it is retained by a nut 13 or other means. On the side of the lever furthest from the mounting plate, at a suitable distance from the pivot hole and towards the middle of the lever, is a boss 14 of the diameter and depth required for the size of the rope or tie to be secured.

The boss 14 is formed with a central portion 15 having integrally formed thereon a pair of flanges 16, 17. Adjacent one flange 17 and formed in the central portion is a part annular groove 18. This groove may be part of an annular grove if this is convenient for manufacture e.g., when machining. However, for the working of the present invention the part annular groove 18 need only extend around about half of its circumference of the boss. Continuous with the part annular groove is a helical groove 19 which extends over substantially one half of the circumference of the central portion 15. A further helical groove 20 of opposite sense is formed in the central portion 15 and is continuous with the helical part 19. The groove 20 extends towards a cut-away portion 22 formed in the flange 17 adjacent the part annular groove 18. In axial view of the boss in FIG. 3 the cut-away portion 22 is offset by about 45° from the point where the helical groove 19 merges with the further helical groove 20.

The lever 11 carries a stop stud 21, the use of which is described later.

In operation (relating the assembly to a clockface and taking the pivot 12 as the centre) with the lever at 9 o'clock as shown (possibly 10 o'clock) a rope R suspended vertically - the standing part - is passed partly round the boss commencing on the side furthest from the pivot and at the side of the boss furthest from the lever. From the lowest point of the circumference of the boss the rope proceeds obliquely in the part helical groove 19 to the top of the circumference nearest the lever, where it passes into the part helical groove 20 obliquely across the boss between the standing part of the rope and the boss, and thereafter through the cut-away portion 22.

With any slack in the standing part of the rope taken up by pulling the free end, movement of the lever in the direction of the arrow (FIG. 3) to the 6 o'clock position fully tensions the standing part which now bears on the oblique portion of the rope in the groove 20, and the groove 18 which it crosses forming a hitch and pressing the oblique portion into the groove 20. Movement of the lever from the 6 o'clock position to the 5 o'clock position causes an upward force to be applied by the standing part of the rope on the boss and the lever urging the stop stud 21 on the lever against the plate 10, thereby holding the boss 14 and lever securely in this position.

Figure 4:
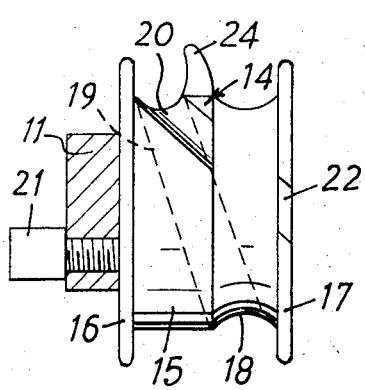
FIG. 4 shows a modified form of the invention in which a spur 24 is provided for location of the rope.

In an alternative form of the invention shown in FIG. 4, a spur or stud 24 is provided extending radially from the central portion 15 to assist in the retention of the rope in the groove 19 by locating the rope to one side of the central portion remote from the flange 17 having the cut-away portion 22.

A cylinder lock could be incorporated in the pivot to prevent reverse movement of the lever to free the rope by an unauthorised person. If desired, the lever may have an eye 25 for receiving the free end of the rope whereby the lever can be instantly returned to the released position by a pull on this rope from a distance, allowing the standing part to run round the boss but still be under the user's control.

Return of the lever to the free position either accidentally or due to momentary slackening of the standing part can be avoided by inserting a pin into a hole in the mounting plate in a suitable position. Alternatively, the eye could be locked to a chain fixed to the top of the mounting plate.

The device serves for tensioning and positively securing ropes and similar ties without the use of knots and is capable of instant release, even remotely.

The securing device may be constructed to operate in either hand. Thus it may be desirable to provide a substantially mirror image of the arrangement shown in the drawing. For example, a pair of securing devices of opposite hand might desirably be provided on the port and starboard sides of a mast to secure respectively the mainsail and foresail halyards.

The boss may be cast in a light alloy (aluminium or magnesium) or bronze or may be moulded in a plastics material.

I claim:

1. A device for securing and/or tensioning ropes comprising:
   a. a lever adapted at one end for pivotal attachment to a fixed point, and
   b. a boss attached to said lever at a distance from said one end,
   c. said boss being of substantially cylindrical form and formed with
   d. a groove in its substantially cylindrical surface having
   e. a first part annular portion extending part way around the circumference of the boss at one side thereof and
   f. a second portion integral with the first portion being substantially helical and leading to a position at the other side of the boss, whereby in use a rope can pass around the boss and lie in said groove passing first along said first portion and then along said second portion whereafter the rope passes between the boss and that portion of the rope passing along said first portion of the groove.

2. A device according to claim 1, herein said groove comprises a third portion integral with said second portion, said third portion being substantially helical in the opposite sense to that of the second portion and leading to a position on said one side of the cylindrical surface of the boss, whereby the rope laying in said third portion of the groove is led between the boss and that portion of the rope passing along said first portion of the groove.

3. A device according to claim 2, wherein a spur or stud is provided extending radially from said boss adjacent the juncture of the second and third portions of the groove.

4. A device according to claim 1, wherein said boss comprises a central portion having a pair of flanges, one of said flanges having a cut-away portion through which the rope passes after it has passed between the boss and that portion of the rope passing along said first portion of the groove.

5. A device according to claim 1, wherein said lever is pivotally attached to a mounting plate which can be secured to a fixed point.

6. A device according to claim 5, wherein the lever is provided with a stop which abuts the mounting plate when the lever is moved to a rope securing position.

7. A device according to claim 1, wherein means are provided to secure said lever in its rope securing position.

* * * * *